(12) United States Patent
Nishio et al.

(10) Patent No.: US 11,736,797 B2
(45) Date of Patent: Aug. 22, 2023

(54) APPARATUS AND METHOD FOR CONTROLLING APPARATUS INCLUDING AN INCLINATION MECHANISM FOR TILTING AN IMAGE SENSOR

(71) Applicant: CANON KABUSHIKI KAISHA, Tokyo (JP)

(72) Inventors: Taisuke Nishio, Kawasaki (JP); Naoki Maruyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 317 days.

(21) Appl. No.: 16/906,986

(22) Filed: Jun. 19, 2020

(65) Prior Publication Data

US 2020/0412961 A1    Dec. 31, 2020

(30) Foreign Application Priority Data

Jun. 25, 2019 (JP) .............................. JP2019-117177
Apr. 6, 2020 (JP) .............................. JP2020-068600

(51) Int. Cl.
*H04N 23/69* (2023.01)
*G02B 15/14* (2006.01)
*H04N 23/67* (2023.01)

(52) U.S. Cl.
CPC ............. *H04N 23/69* (2023.01); *G02B 15/14* (2013.01); *H04N 23/67* (2023.01)

(58) Field of Classification Search
CPC .......... H04N 5/23296; H04N 5/23212; H04N 5/232; H04N 23/69; H04N 23/67; H04N 23/60; G02B 15/14; G02B 27/0025; G02B 27/0075
See application file for complete search history.

(56) References Cited

U.S. PATENT DOCUMENTS

| | | | |
|---|---|---|---|
| 9,584,730 B2* | 2/2017 | Costigan | H04N 5/335 |
| 2002/0080242 A1* | 6/2002 | Takahashi | H04N 5/23258 348/347 |
| 2016/0261801 A1* | 9/2016 | Horikawa | H04N 5/23287 |
| 2017/0272658 A1* | 9/2017 | Ito | G02B 7/34 |

FOREIGN PATENT DOCUMENTS

JP    2016-042194 A    3/2016

* cited by examiner

*Primary Examiner* — Luong T Nguyen
(74) *Attorney, Agent, or Firm* — Canon U.S.A., Inc. IP Division

(57) ABSTRACT

An apparatus includes a sensor driving unit configured to incline an imaging sensor with respect to a plane orthogonal to an optical axis of an imaging optical system, a focus lens driving unit configured to change a position of a focus lens in the imaging optical system, a range change unit configured to change an imaging range, and a control unit configured to control the position of the focus lens, the imaging range, and an angle of the imaging sensor so that a first inclined focal plane and a second inclined focal plane after a position of the first inclined focal plane is changed have a predetermined relationship.

5 Claims, 18 Drawing Sheets

$h = H - L \times \tan\theta$: IF L IS FIXED
$L = (H - h) / \tan\theta$: IF h IS FIXED
$a = L / \cos\theta = (H - h) / \sin\theta$

APPARATUS AND METHOD FOR CONTROLLING APPARATUS INCLUDING AN INCLINATION MECHANISM FOR TILTING AN IMAGE SENSOR

BACKGROUND OF THE INVENTION

Field of the Invention

The aspect of the embodiments relates to an apparatus and a method for controlling an apparatus, and in particular, relates to an apparatus including an inclination mechanism for tilting an imaging sensor, and a method for controlling the same.

Description of the Related Art

There is a conventional technique for tilting an imaging sensor with respect to the optical axis of a lens (sensor inclination).

In a case where the imaging sensor is perpendicular to the optical axis (is not inclined), only an object at a particular distance in the optical axis direction comes into focus. That is, the focal plane is a plane perpendicular to the optical axis. Thus, in the case of a scene with depth, it is not possible to focus on an object on the near side to an object on the far side.

Meanwhile, the imaging sensor is tilted (inclined) with respect to the optical axis, whereby it is possible to tilt the focal plane with respect to the optical axis and set the focal plane as a plane other than a plane perpendicular to the optical axis. In this case, it is possible to focus on objects at different distances in the optical axis direction. That is, it is possible to focus on planes on which a distant object and a close object exist. Thus, if the imaging sensor is inclined according to the distribution of object distances in the angle of view, it is possible to focus on objects located from the nearer side to the farther side as compared with a case where the imaging sensor is not inclined.

Such a technique is discussed in, for example, Japanese Patent Application Laid-Open No. 2016-042194. Japanese Patent Application Laid-Open No. 2016-042194 discusses a technique for performing sensor inclination imaging by adjusting the tilt of an imaging device to bring a plurality of specified areas into focus.

In the conventional technique discussed in Japanese Patent Application Laid-Open No. 2016-042194, however, the position of the focal plane cannot be adjusted by inclining a sensor to translate the focal plane focusing on the ground.

For example, suppose that the inclination angle of the sensor is set so that a horizontal plane such as a road surface or the ground surface comes into focus. The position of the focal plane cannot be changed by translating the position of the focal plane from this state while maintaining the tilt of the focal plane so that a horizontal plane having a predetermined height from the road surface or the ground surface comes into focus. If the sensor is not inclined, the position of the focal plane can be translated in the depth direction by only moving a focus lens. If, however, only the focus lens is moved in the state where the sensor is inclined, the tilt of the focal plane changes. If the tilt of the focal plane changes, it may be difficult to obtain the effect of sensor inclination that a range that comes into focus is widened in the depth direction by tilting the focal plane in the depth direction.

Further, even in a case where the focal plane aligned on the ground surface can be translated by inclining the sensor, it is possible that in the focal plane, the range in the depth direction of an object that can be captured narrows. That is, it is possible that even though an attempt is made to focus on objects in a wide range from the near side to the far side by inclining the sensor, the depth of an object that falls within the angle of view becomes small.

SUMMARY OF THE INVENTION

According to an aspect of the embodiments, an apparatus includes a sensor driving unit configured to incline an imaging sensor with respect to a plane orthogonal to an optical axis of an imaging optical system, a focus lens driving unit configured to change a position of a focus lens in the imaging optical system, a range change unit configured to change an imaging range, and a control unit configured to control the position of the focus lens, the imaging range, and an angle of the imaging sensor so that a first inclined focal plane and a second inclined focal plane after a position of the first inclined focal plane is changed have a predetermined relationship.

Further features of the disclosure will become apparent from the following description of exemplary embodiments with reference to the attached drawings.

DESCRIPTION OF THE EMBODIMENTS

Exemplary embodiments of the disclosure will be described in detail below based on the attached drawings.

Figure 1:
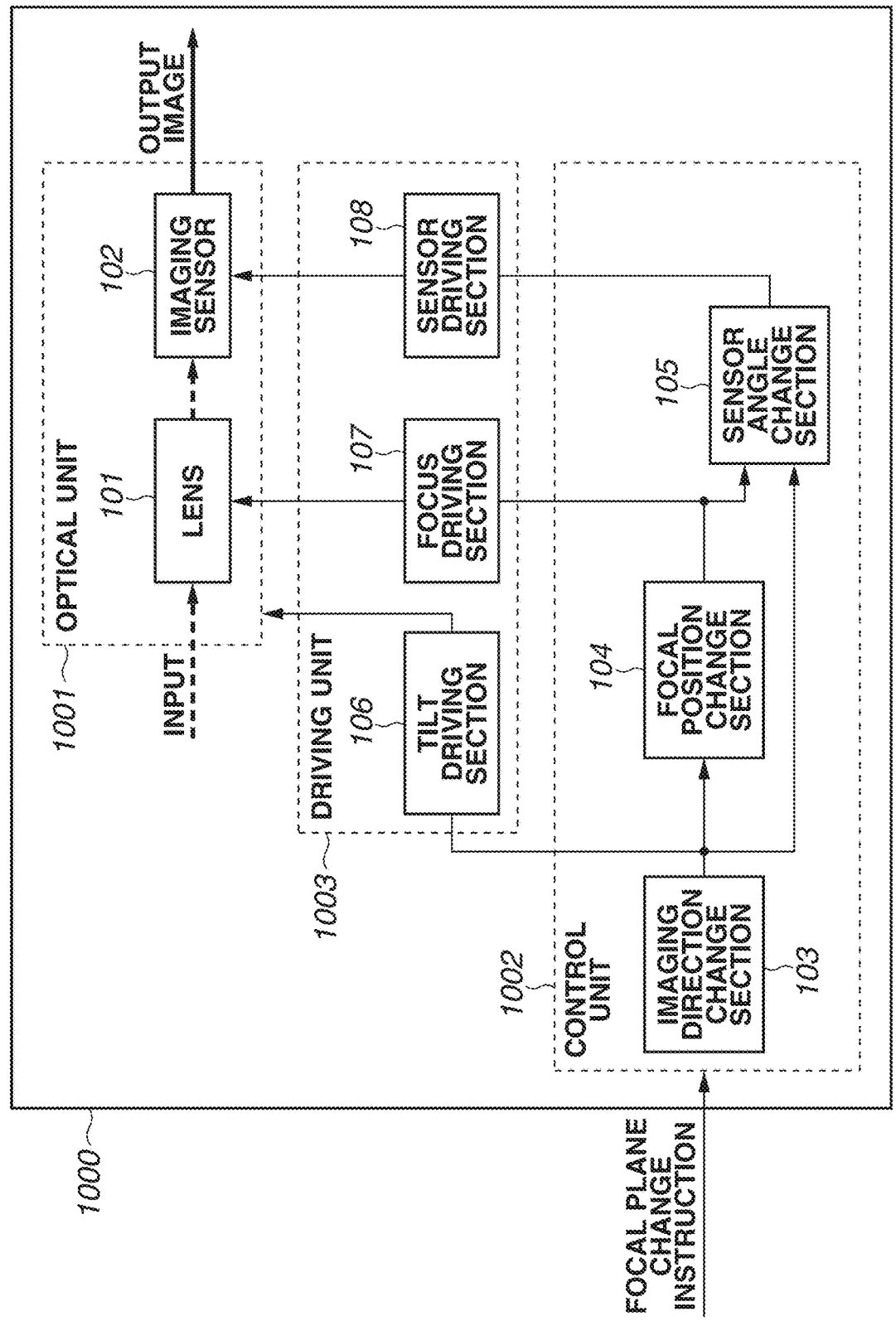
FIG. 1 is a configuration diagram illustrating an imaging apparatus according to a first exemplary embodiment of the disclosure.

With reference to FIG. 1, an imaging apparatus according to a first exemplary embodiment of the disclosure will be described below. FIG. 1 is a configuration diagram illustrating an example of the functional configuration of the imaging apparatus according to the disclosure.

In the present exemplary embodiment, the position of a focus lens and the inclination angle of a sensor are set in advance so that a plane as a reference (a reference plane) such as a road surface or the ground surface comes into focus. Then, by specifying the amount of change in the position of the focal plane, the focal plane is translated from the reference plane by an amount corresponding to the specified amount of change. The amount of change in the position of the focal plane is, for example, the distance from the reference plane.

An imaging apparatus 1000 includes an optical unit 1001, a control unit 1002, and a driving unit 1003.

The optical unit 1001 includes a lens 101 and an imaging sensor 102. The optical unit 1001 captures input light such as light reflected from an object, converts the light into an image signal, and outputs the image signal.

The lens 101 as an imaging optical system collects input light and forms an object image on the imaging sensor 102. The lens 101 may include a plurality of lenses. In the present exemplary embodiment, the lens 101 moves the position of a focus lens included in the lens 101 and thereby can focus on an object at a predetermined object distance.

The imaging sensor 102 converts the object image formed on an imaging surface composed of a plurality of imaging devices two-dimensionally arranged into an electric signal to generate an image signal of the object. The imaging sensor 102 then outputs the generated image signal.

The control unit 1002 as a control unit includes an imaging direction change section 103, a focal position change section 104, and a sensor angle change section 105.

The imaging direction change section 103 as a range change unit acquires an instruction to change the position of the focal plane (a focal plane change instruction), and, calculates the amount of change in the tilt angle based on the amount of change in the position of the focal plane. The imaging direction change section 103 instructs a tilt driving section 106 to change the direction of the imaging apparatus 1000 by the calculated amount of change. The imaging direction change section 103 outputs the amount of change in the tilt angle to the focal position change section 104. The focal plane change instruction is an instruction specifying the amount of change in the position of the focal plane and is an instruction specifying an amount indicating the distance from a reference plane.

Based on the amount of change in the tilt angle and the amount of change in the position of the focal plane that are acquired from the imaging direction change section 103, the focal position change section 104 calculates the position of the focus lens and instructs a focus driving section 107 to drive the focus lens to the calculated position. The focal position change section 104 outputs the position of the focus lens to the sensor angle change section 105.

Based on the amount of change in the tilt angle acquired from the imaging direction change section 103 and the position of the focus lens acquired from the focal position change section 104, the sensor angle change section 105 calculates the inclination angle of the imaging sensor 102. The sensor angle change section 105 instructs a sensor driving section 108 to drive the imaging sensor 102 to reach the calculated inclination angle.

The driving unit 1003 includes the tilt driving section 106, the focus driving section 107, and the sensor driving section 108.

The tilt driving section 106 is a tilt driving mechanism for changing the tilt direction of the imaging apparatus 1000. The tilt driving section 106 changes the imaging direction (the tilt direction) of the imaging apparatus 1000 based on an instruction from the imaging direction change section 103.

The focus driving section 107 is a focus lens driving mechanism for driving the focus lens included in the lens 101. The focus driving section 107 drives the lens 101 based on an instruction from the focal position change section 104.

The sensor driving section 108 is an inclination driving mechanism for changing the inclination angle of the imaging sensor 102. The sensor driving section 108 drives the imaging sensor 102 based on an instruction from the sensor angle change section 105 to change the inclination angle of the imaging sensor 102. That is, the sensor driving section 108 inclines the imaging sensor 102 with respect to a plane orthogonal to the optical axis of the lens 101.

Figure 2:
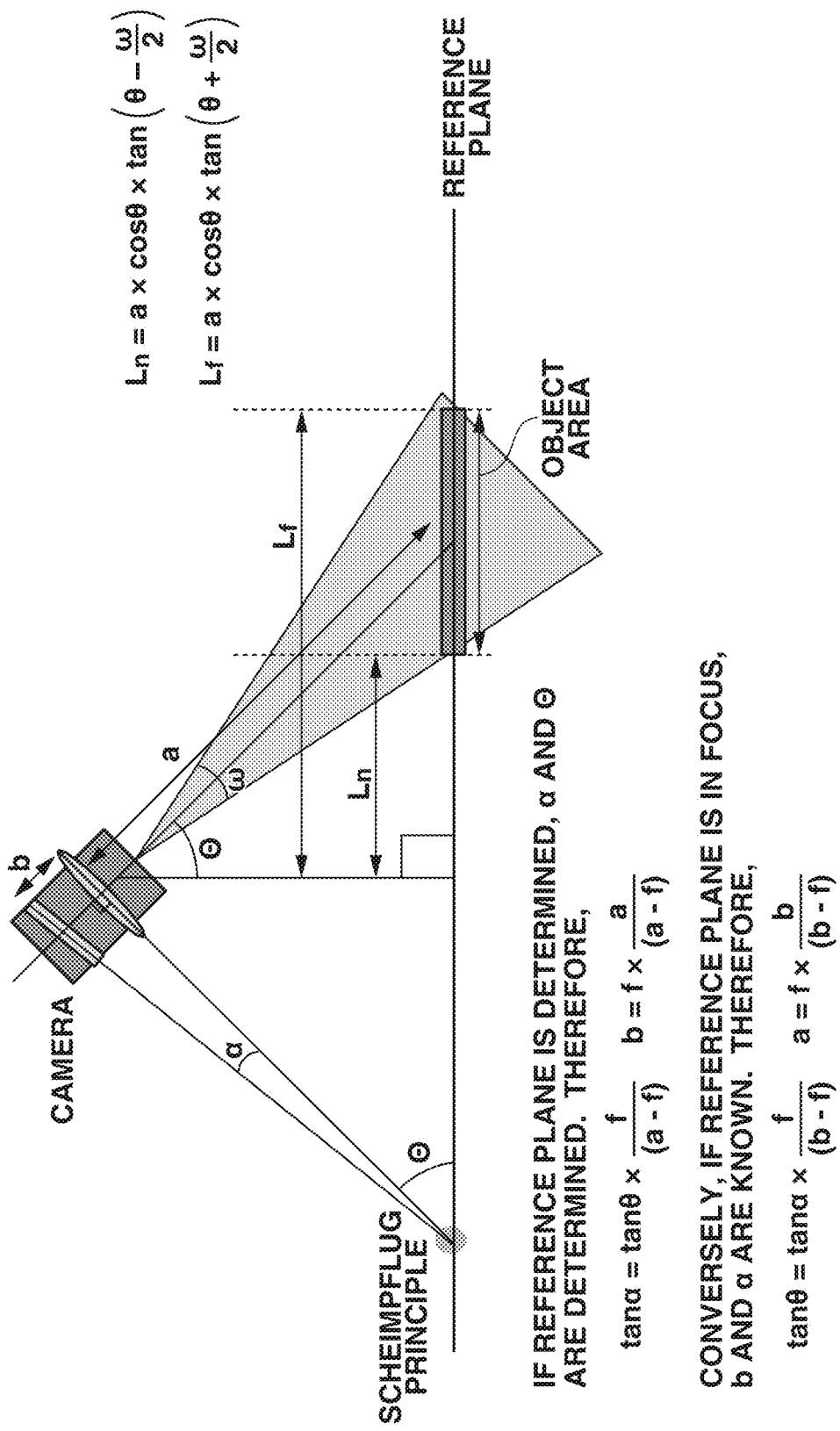
FIG. 2 is a diagram illustrating a part of a principle according to the first exemplary embodiment of the disclosure.
Figure 3:
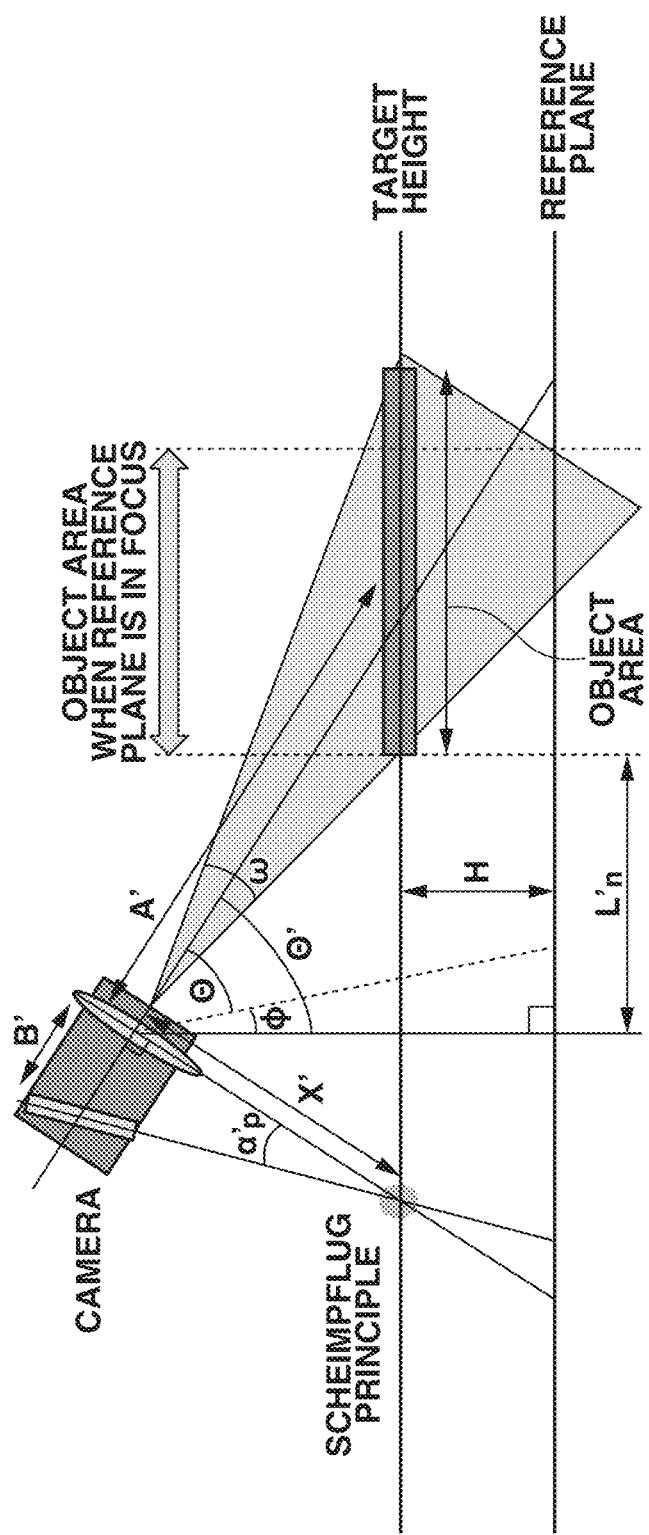
FIG. 3 is a diagram illustrating a part of the principle according to the first exemplary embodiment of the disclosure.

Next, with reference to FIGS. 2 and 3, the amount of change in the tilt angle, the position of the focus lens, and the inclination angle will be specifically described. FIG. 2 illustrates the state where the focal plane is aligned with the reference plane. FIG. 3 illustrates the state where the focal plane is translated by a distance H from the reference plane.

If the object distance is a, the angle between the optical axis and a perpendicular line with respect to the reference plane is θ, the angle of view is ω, and the focal length is f, an inclination angle α and a position b of the focus lens to align the focal plane with the reference plane are represented as follows.

$$\tan\alpha = \tan\theta \times \frac{f}{(a-f)} \quad \text{(formula 1)}$$

$$b = f \times \frac{a}{(a-f)}$$

A distance $L_n$ to the near end of a range of the focal plane included in the angle of view of the imaging apparatus 1000 (an object area) and a distance $L_f$ to the far end of the object area are represented as follows.

$$L_n = a \times \cos\theta \times \tan\left(\theta - \frac{\omega}{2}\right) \quad \text{(formula 2)}$$

$$L_f = a \times \cos\theta \times \tan\left(\theta + \frac{\omega}{2}\right)$$

Next, with reference to FIG. 3, a description is given of the state where the focal plane is translated by the distance H from the reference plane.

An amount of change p in the tilt angle is calculated so that a distance $L'_n$ to the near end of the range of the focal plane included in the angle of view of the imaging apparatus 1000 (the object area) obtained by translating the focal plane by the distance H from the reference plane is equal to the distance $L_a$ in a case where the reference plane is in focus. Specifically, according to the amount of change H in the position of the focal plane, the imaging direction change section 103 calculates the amount of change p in the tilt angle so that the following formula is satisfied.

If the object distance is A', the angle between the optical axis and the reference plane is θ', the angle of view is ω, and the focal length is f in a case where the focal plane is translated by the distance H from the reference plane, the distance $L'_n$ to the near end of the range of the focal plane (the object area) is represented as follows.

$$L'_n = (a \times \cos\theta - H) \times \tan\left(\theta' - \frac{\omega}{2}\right) = L_n \quad \text{(formula 3)}$$

$$\theta' = \theta + \phi$$

Next, the focal position change section 104 calculates a position B' of the focus lens when the focal plane is translated by the distance H, as follows.

$$B' = f \times \frac{A'}{(A' - f)} \quad \text{(formula 4)}$$

$$A' = \frac{a \times \cos\theta - H}{\cos(\theta + \phi)}$$

Further, the sensor angle change section 105 calculates an inclination angle $\alpha'_p$ when the focal plane is translated by the distance H, as follows.

$$\tan\alpha'_p = \tan\theta' \times \frac{B' - f}{f} \quad \text{(formula 5)}$$

In the present exemplary embodiment, examples have been illustrated where the imaging direction change section 103, the focal position change section 104, and the sensor angle change section 105 calculate the control amounts based on the above mathematical formulas. The methods for calculating the control amounts, however, are not limited to these. Alternatively, control amounts calculated based on mathematical formulas may be held as table data in advance, and, corresponding control amounts may be read from the table data according to the amount of change in the position of the focal plane. Further, the mathematical formulas for calculating the control amounts are not limited to those described above, either. Alternatively, for example, mathematical formulas obtained by making the above mathematical formulas simpler may be used. Alternatively, the control amounts may be obtained without using mathematical formulas. For example, experimentally obtained control amounts may be held as table data. Alternatively, when the imaging apparatus 1000 is installed at an actual installation location, desirable control amounts may be determined while confirming a captured image, and may be stored as table data.

Figure 4:
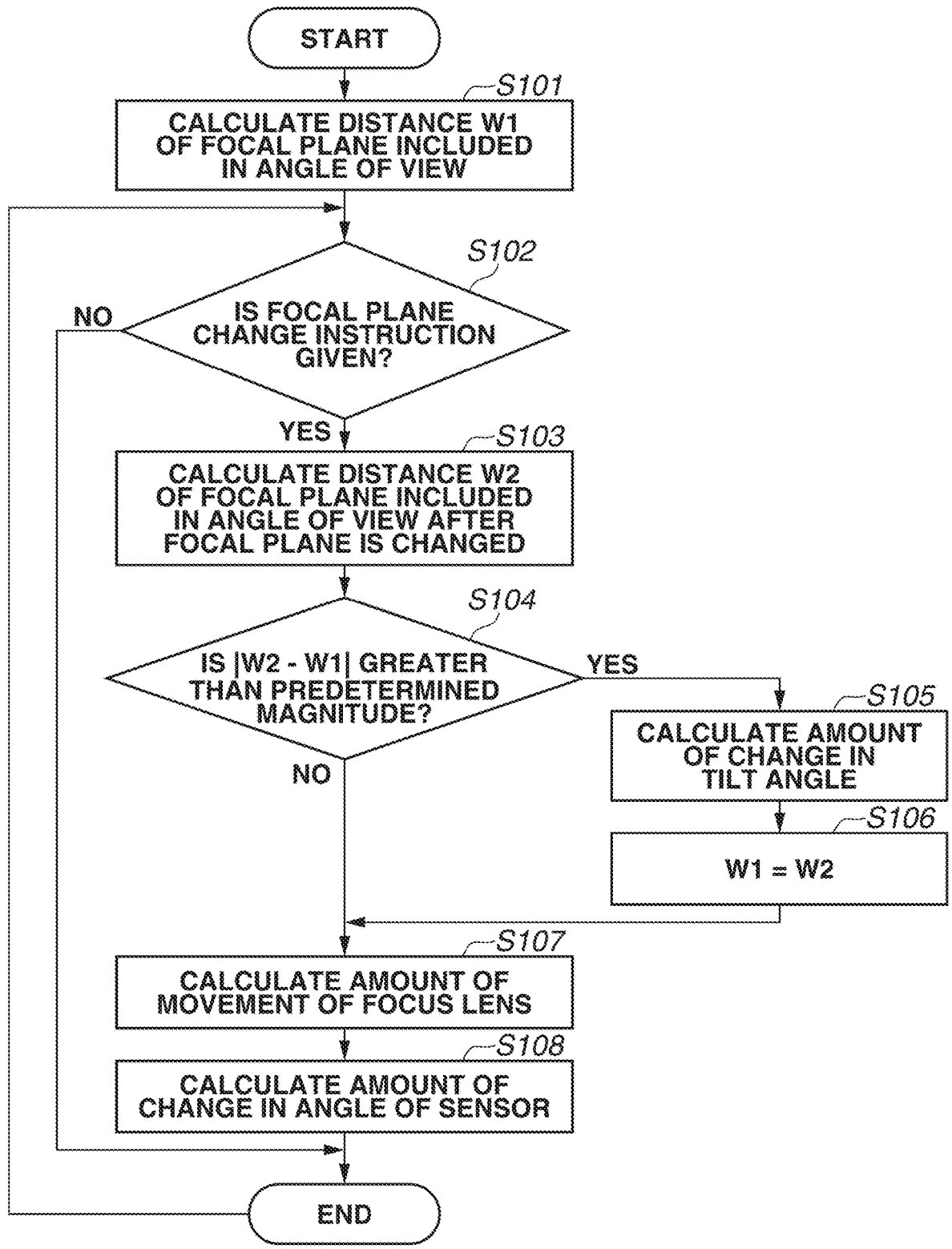
FIG. 4 is a flowchart illustrating a part of a processing flow according to the first exemplary embodiment of the disclosure.

Next, with reference to FIG. 4, an example of the processing flow of the imaging apparatus according to the present exemplary embodiment will be described. FIG. 4 is a flowchart illustrating a part of the flow of the processing of the imaging apparatus according to the present exemplary embodiment.

In step S101, the imaging direction change section 103 calculates and stores a distance W1 in the focal plane direction of a range, included in the angle of view of the imaging apparatus 1000, of the focal plane before the position of the focal plane is changed.

In step S102, the driving unit 1003 determines whether a focal plane change instruction is given. If the focal plane change instruction is given (YES in step S102), the processing proceeds to step S103. If the focal plane change instruction is not given (NO in step S102), on the other hand, the processing is ended.

In step S103, the imaging direction change section 103 calculates a distance W2 in the focal plane direction of a range, included in the angle of view of the imaging apparatus 1000, of the focal plane after the position of the focal plane is changed.

In step S104, the imaging direction change section 103 calculates the difference between the distances W1 and W2 and determines whether the difference is greater than or equal to a predetermined magnitude. If the difference is greater than or equal to the predetermined magnitude (YES in step S104), the processing proceeds to step S105. If the difference is not greater than or equal to the predetermined magnitude (NO in step S104), the processing proceeds to step S107.

In step S105, the imaging direction change section 103 calculates the amount of change in the tilt angle.

In step S106, the imaging direction change section 103 updates the stored distance W1 to the distance W2 calculated in step S103.

In step S107, the focal position change section 104 calculates the position of the focus lens included in the lens 101.

In step S108, the sensor angle change section 105 calculates the angle (the amount of inclination) of the imaging sensor 102.

Then, the tilt driving section 106 changes the tilt direction of the imaging apparatus 1000 based on the calculated amount of change φ in the tilt angle. The focus driving section 107 moves the focus lens to the position B' of the focus lens. The sensor driving section 108 rotates the imaging sensor 102 to reach the inclination angle $\alpha'_p$. Specifically, according to the amount of change in the position of the focal plane specified by a user, the control unit 1002 simultaneously causes the tilt driving section 106, the focus driving section 107, and the sensor driving section 108 to operate. Alternatively, the control unit 1002 may shift the timings to start the operations thereof so that the changes in the tilt direction of the imaging apparatus 1000, the position of the focus lens, and the inclination angle are simultaneously completed.

Based on the above configuration, according to the amount of change in the position of the focal plane, the imaging apparatus according to the present exemplary embodiment controls the distance in the focal plane direction of the focal plane included in the angle of view of the imaging apparatus by setting the position of the focal plane, the tilt angle of the imaging apparatus, and the angle of the sensor to have predetermined relationships. More specifically, the imaging apparatus according to the present exemplary embodiment controls the distance in the focal plane direction of the focal plane included in the angle of view of the imaging apparatus before the position of the focal plane is changed, and the distance in the focal plane direction of the focal plane included in the angle of view of the imaging apparatus after the position of the focal plane is changed so that the distances are approximately constant.

Consequently, the imaging apparatus according to the present exemplary embodiment can translate the position of the focal plane while maintaining the distance in the focal plane direction of the focal plane included in the angle of view of the imaging apparatus (the object area) approximately constant.

The imaging apparatus according to the present exemplary embodiment performs control so that, if the size of the object area changes by a predetermined amount or more when the position of the focal plane is changed, the tilt driving section 106 changes the tilt angle. This can prevent the angle of view from frequently changing.

Figure 17:
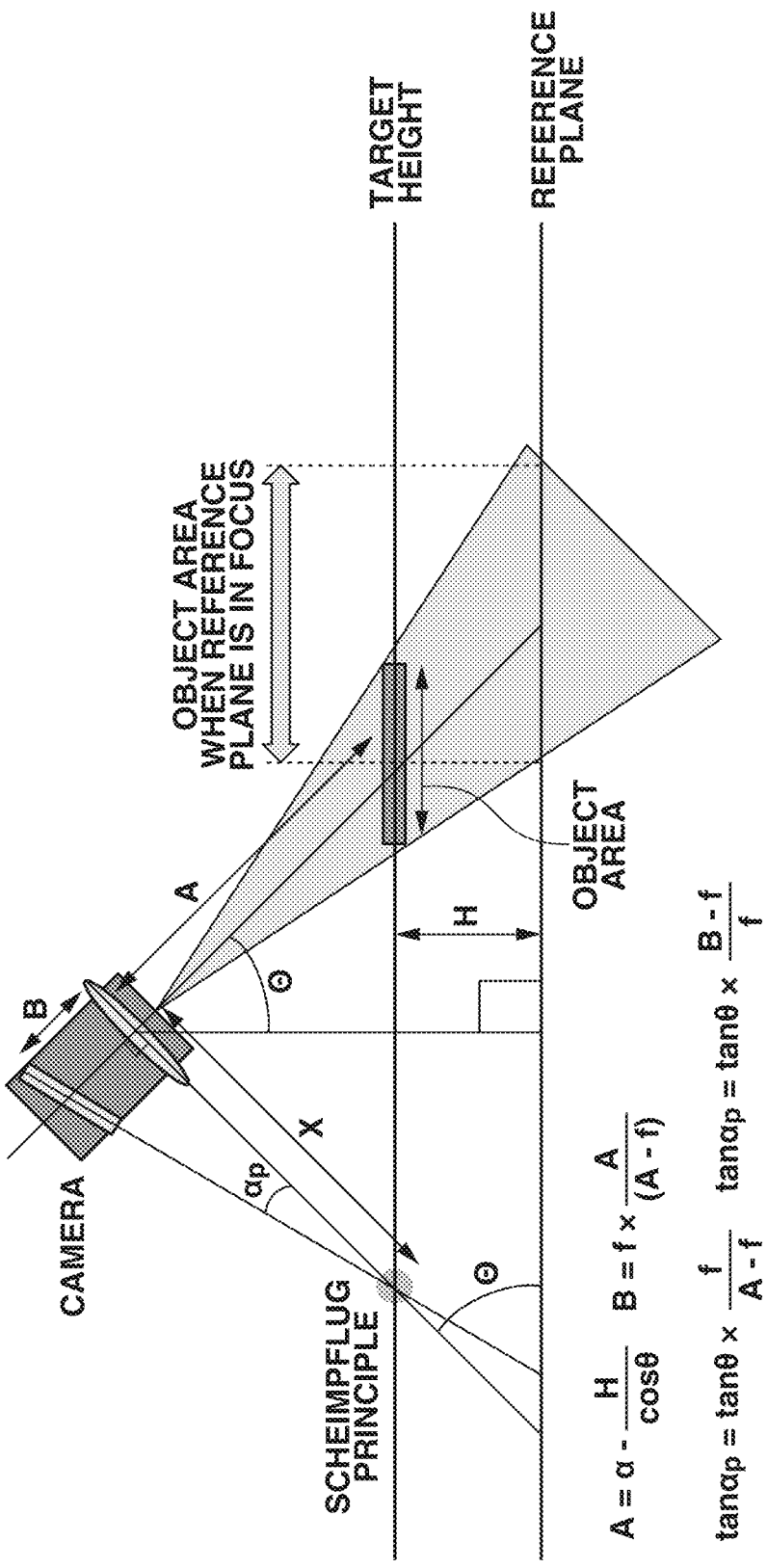
FIG. 17 is a diagram illustrating a part of a principle of an imaging apparatus according to a comparative example.
Figure 18:
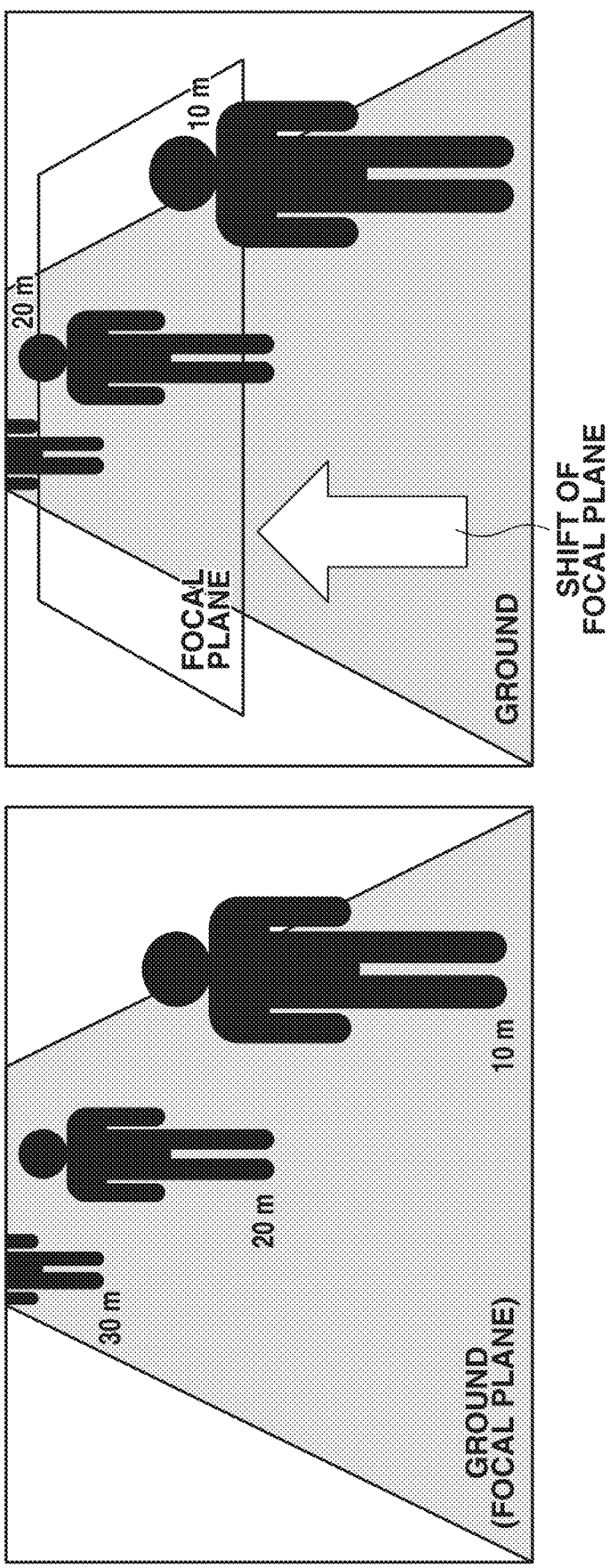
FIG. 18 is a diagram illustrating examples of captured images of the imaging apparatus according to the comparative example.

With reference to a comparative example, the effects of the aspect of the embodiments will be described below. As illustrated in FIG. 17, if the imaging direction remains fixed when the position of the focal plane is moved, the object area narrows, and the position of the object area also changes. In such a case, the distance in the depth direction of an object that can be captured becomes small, as illustrated in FIG. 18, in a predetermined focal plane. That is, even though an attempt is made to focus on objects in a wide range from the near side to the far side by inclining the imaging sensor 102, the depth itself of objects that fall within the angle of view becomes small. This may hinder the effect of sensor inclination.

For example, in a case where the focal plane is the ground surface as illustrated on the left of FIG. 18, objects from 10 m to 30 m on the road surface can be brought into focus. If, however, the position of the focal plane is translated to the height of a human face as illustrated on the right of FIG. 18, only the objects from 10 m to 20 m can be brought into focus. That is, due to the translation of the position of the focal plane, the range of objects that can be brought into focus (the object area) narrows.

Figure 5:
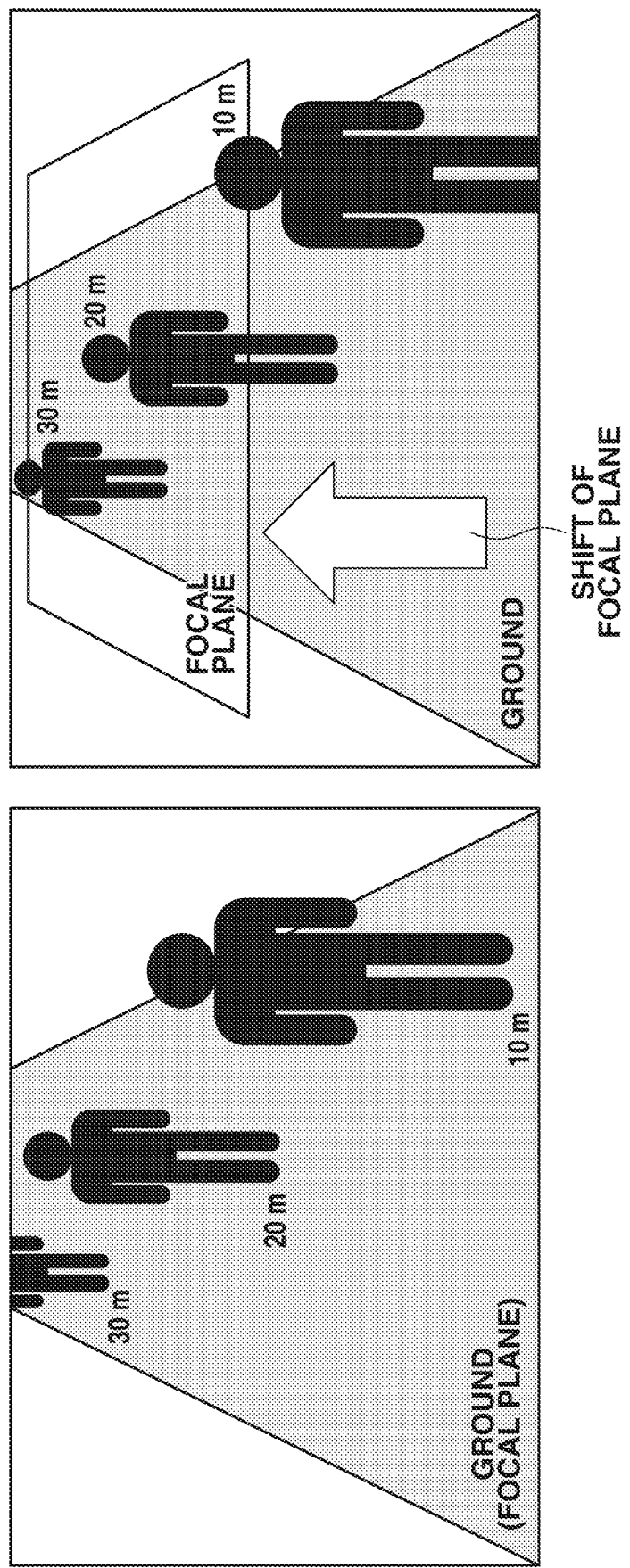
FIG. 5 is a diagram illustrating examples of captured images according to the disclosure.

In the imaging apparatus according to the aspect of the embodiments, on the other hand, when the position of the focal plane is moved, the imaging direction is changed in conjunction with the movement of the focal plane as illustrated in FIG. 5. Thus, even if the position of the focal plane is translated to the height of a human face as illustrated on the right of FIG. 5, then objects (human faces) from 10 m to 30 m can be brought into focus similarly to the case where the focal plane is the ground.

Examples of use cases assumed in the aspect of the embodiments are described below.

For example, as a use case of a monitoring camera to which the aspect of the embodiments is applied, there is a use case where the position of the focal plane is automatically changed according to the purpose of monitoring. For example, suppose that a passage through which people pass is being captured as illustrated in FIG. 5. If the purpose of monitoring is to capture people to search for a suspicious person, then as illustrated on the right of FIG. 5, the focal plane is moved to the height of a human face. If, on the other hand, the purpose of monitoring is to capture physical bodies on the road to search for a suspicious object or a lost property, then as illustrated on the left of FIG. 5, the focal plane is moved to the road surface (the ground surface). By carrying out this method, it is possible to obtain a suitable captured image for each purpose of monitoring.

Alternatively, as a use case of an industrial camera to which the aspect of the embodiments is applied, there is a use case of the image inspection (appearance inspection) of articles manufactured in a factory. For example, a case is considered where products are stored in a vertically stacked manner to save space in a factory, captured by a camera, and inspected by a method such as image analysis so that a defective product is not mixed. As illustrated in FIG. 3, the imaging apparatus according to the aspect of the embodiments can capture an image while vertically moving the height of the focal plane. Thus, a high-quality captured image is obtained in which stacked products are brought into focus according to the positions and the heights of the stacked products. This can improve the accuracy of image analysis. Further, since products can be arranged in a vertically stacked manner, it is possible to inspect a plurality of products without moving the products.

Figure 6:
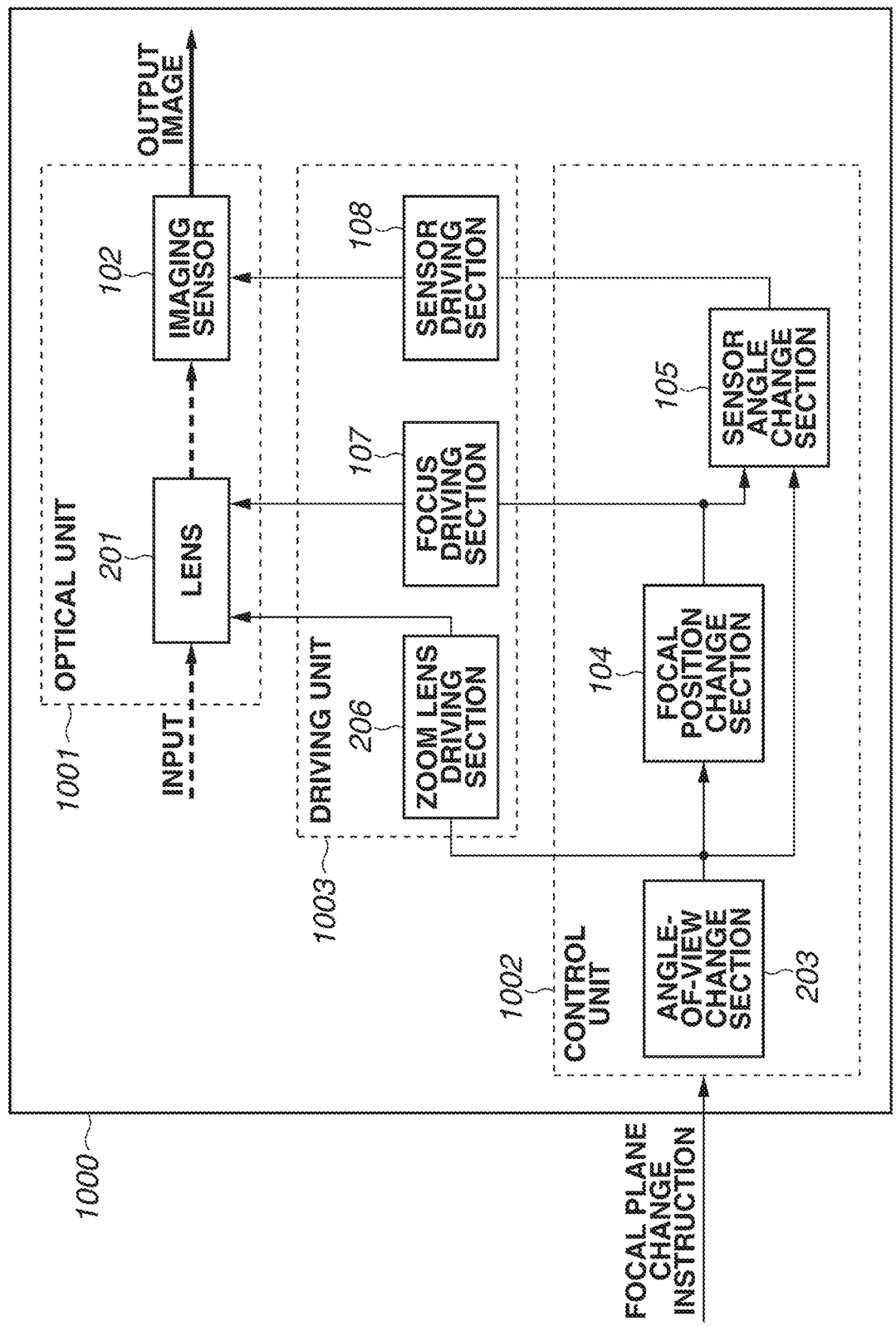
FIG. 6 is a configuration diagram illustrating an imaging apparatus according to a second exemplary embodiment of the disclosure.

Next, with reference to FIG. 6, an imaging apparatus according to a second exemplary embodiment of the disclosure will be described. In the first exemplary embodiment, as a method for changing the imaging range, the imaging direction change section 103 changes the direction of the imaging apparatus 1000. In the second exemplary embodiment, an angle-of-view change section 203 changes the position of a zoom lens to change the focal length. Function units similar to those of the first exemplary embodiment are designated by the same numerals, and are not described here. FIG. 6 is a configuration diagram illustrating an example of the functional configuration of the imaging apparatus according to the present exemplary embodiment.

A lens 201 includes a focus lens and a zoom lens. The lens 201 moves the position of the focus lens and thereby can focus on an object at a predetermined object distance. The lens 201 moves the position of the zoom lens and thereby can change the focal length and change the angle of view.

The angle-of-view change section 203 as a range change unit acquires an instruction to change the position of the focal plane (a focal plane change instruction), and based on the amount of change in the position of the focal plane, calculates the angle of view. Then, the angle-of-view change section 203 instructs a zoom lens driving section 206 to drive the zoom lens to reach the calculated angle of view. The angle-of-view change section 203 outputs the calculated angle of view to the focal position change section 104.

The zoom lens driving section 206 is a zoom mechanism for changing the angle of view of the imaging apparatus 1000. Based on an instruction from the angle-of-view change section 203, the zoom lens driving section 206 moves the position of the zoom lens to change the focal length.

Figure 7:
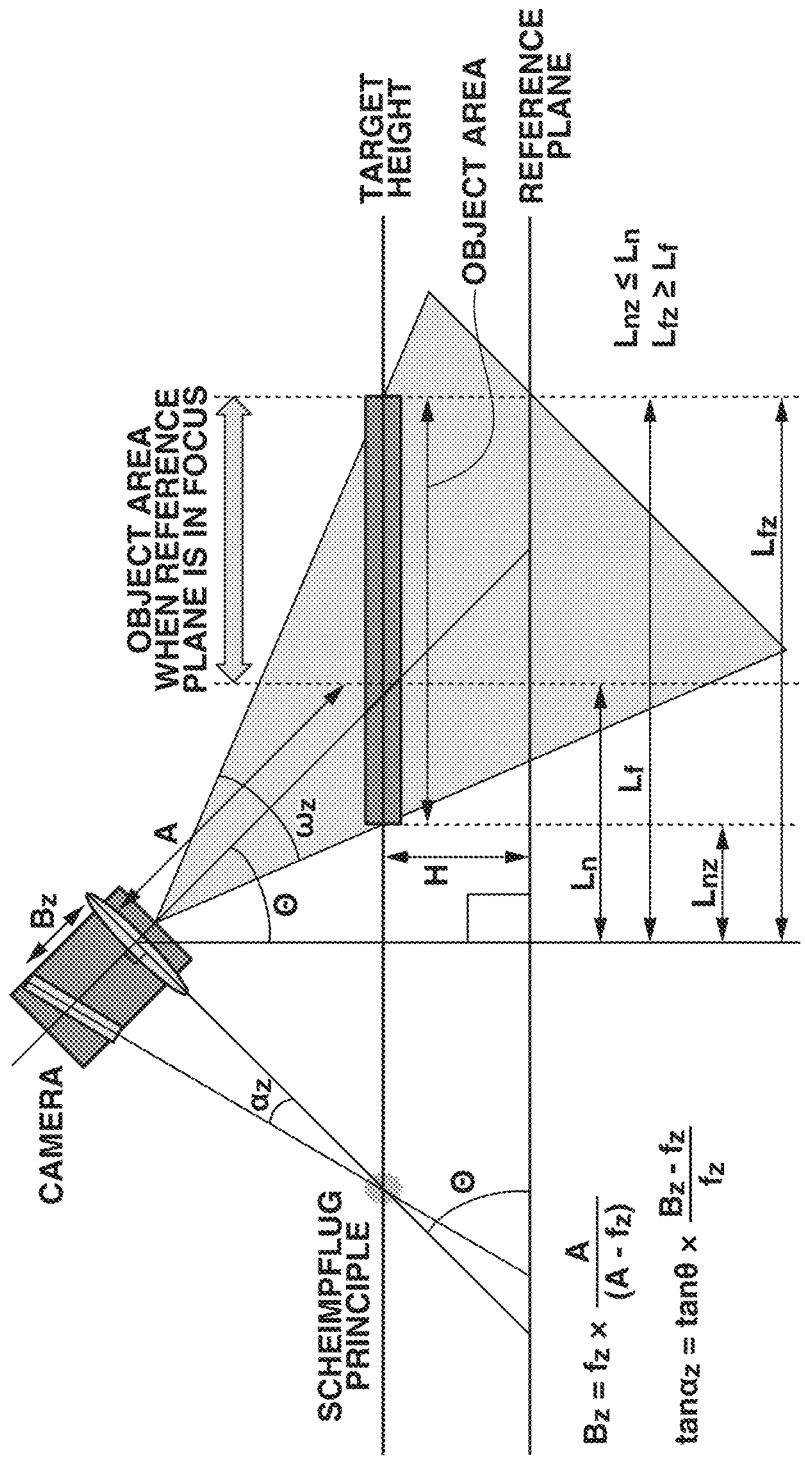
FIG. 7 is a diagram illustrating a part of a principle according to the second exemplary embodiment of the disclosure.

An angle of view $\omega_z$ after the focal plane is moved is determined as follows. In a case where, as illustrated in FIG. 7, the reference plane is in focus, and the angle of view is $\omega$, the near end of the object area is $L_n$, and the far end of the object area is $L_f$. Then, after the focal plane is moved by the distance H, and the angle of view $\omega$ is changed to the angle of view $\omega_z$, the near end of the object area is $L_{nz}$, and the far end of the object area is $L_{fz}$. After the angle of view $\omega$ is changed to the angle of view $\omega_z$, the focal length is $f_z$. Then, the angle of view $\omega_z$ after the focal plane is moved is determined so that the following formula is satisfied.

$$L_{nz} \leq L_n$$

$$L_{fz} \geq L_f \quad \text{(formula 6)}$$

If the above formula is satisfied, it is possible to perform control so that, as illustrated in FIG. 7, the size of the object area after the focal plane is moved is greater than or equal to the size of the object area before the focal plane is moved.

Figure 8:
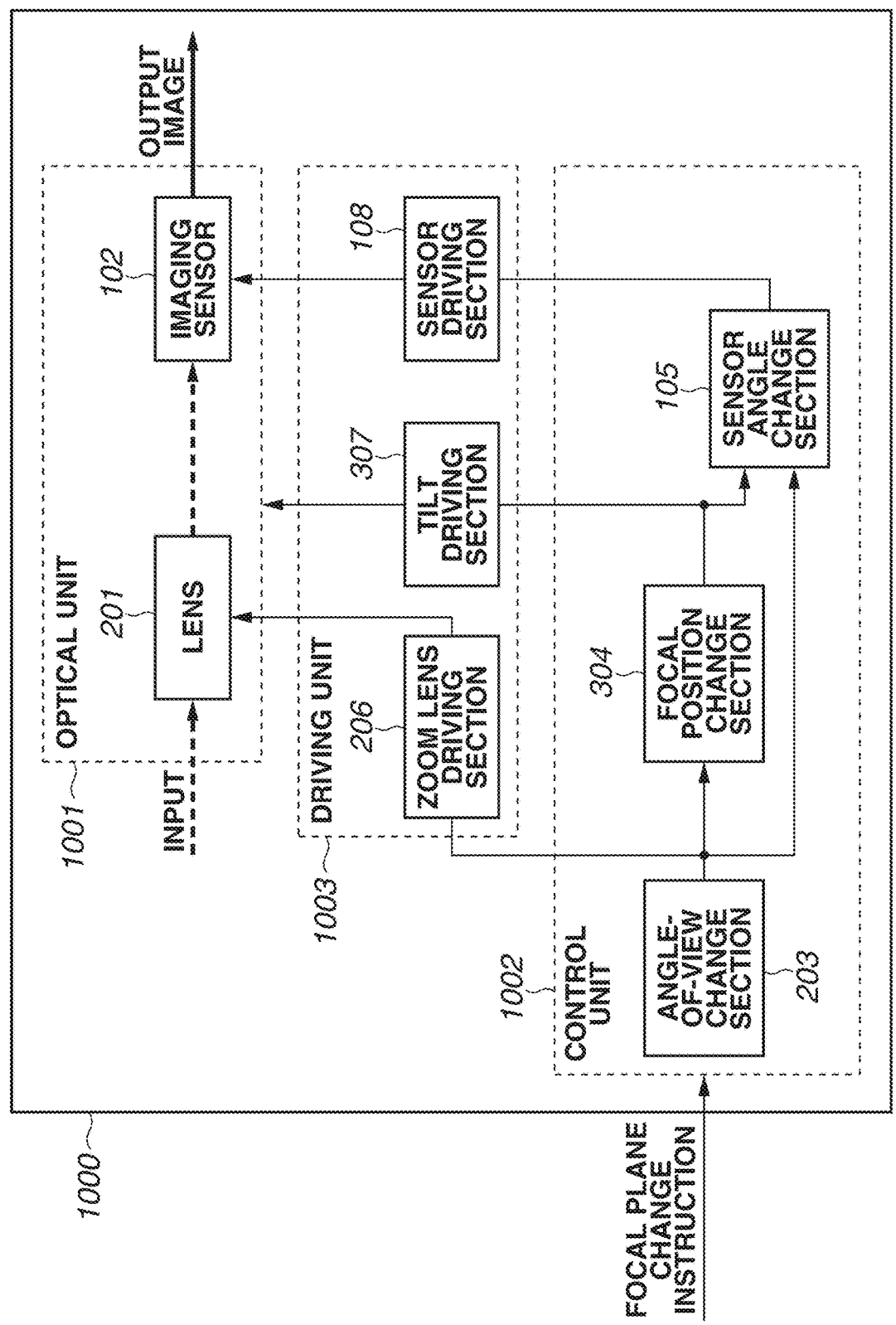
FIG. 8 is a configuration diagram illustrating an imaging apparatus according to a third exemplary embodiment of the disclosure.

Next, with reference to FIG. 8, an imaging apparatus according to a third exemplary embodiment of the disclosure will be described. In the present exemplary embodiment, as a method for changing the position of the focal plane, the tilt angle is changed by controlling a mechanism as a direction change unit for changing the direction of the imaging apparatus (a tilt mechanism). As a unit for changing the imaging range of the imaging apparatus, the position of a zoom lens is changed, thereby changing the focal length. FIG. 8 is a configuration diagram illustrating an example of the functional configuration of the imaging apparatus according to the present exemplary embodiment. Function units similar to those of the first and second exemplary embodiments are designated by the same numerals, and are not described here.

Based on the amount of change in the position of the focal plane, a focal position change section 304 calculates an amount of change Ψ in the direction of the imaging apparatus 1000 and instructs a tilt driving section 307 to change the imaging direction by the calculated amount of change. The focal position change section 304 outputs the amount of change Ψ in the direction of the imaging apparatus 1000 to the sensor angle change section 105.

The tilt driving section 307 is a tilt driving mechanism for changing the direction of the imaging apparatus 1000. The tilt driving section 307 changes the direction of the imaging apparatus 1000 based on an instruction from the focal position change section 304, thereby changing the position of the focal plane.

Figure 9:
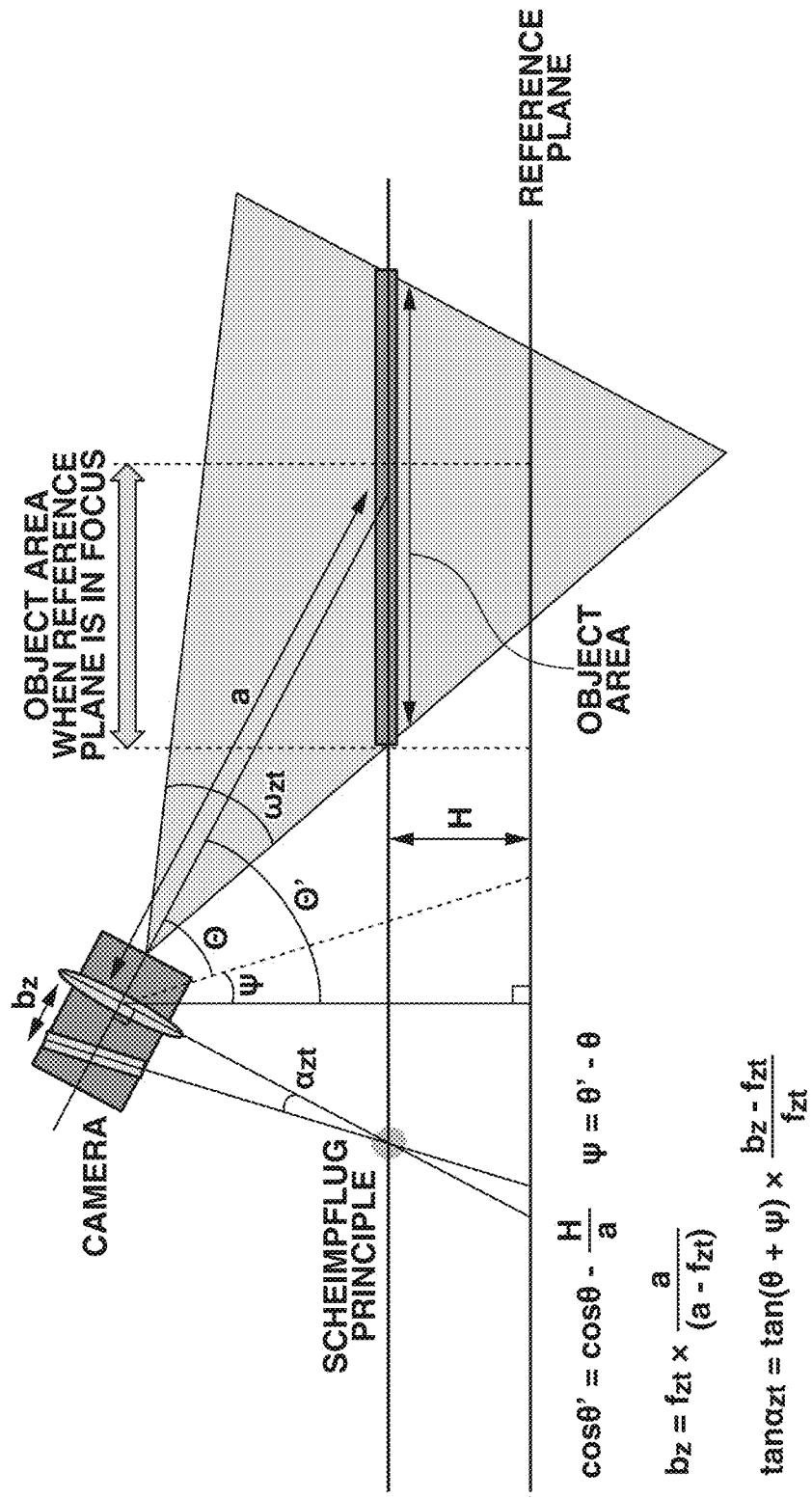
FIG. 9 is a diagram illustrating a part of a principle according to the third exemplary embodiment of the disclosure.

Based on the above configuration, in a case where, as illustrated in FIG. 9, the direction of the imaging apparatus 1000 is changed to change the position of the focal plane, the zoom lens included in the lens 201 is moved according to the amount of change in the direction of the imaging apparatus 1000 so as to change the angle of view. Consequently, it is possible to perform control so that, as illustrated in FIG. 9, the size of the object area after the focal plane is moved is greater than or equal to the size of the object area before the focal plane is moved.

Figure 10:
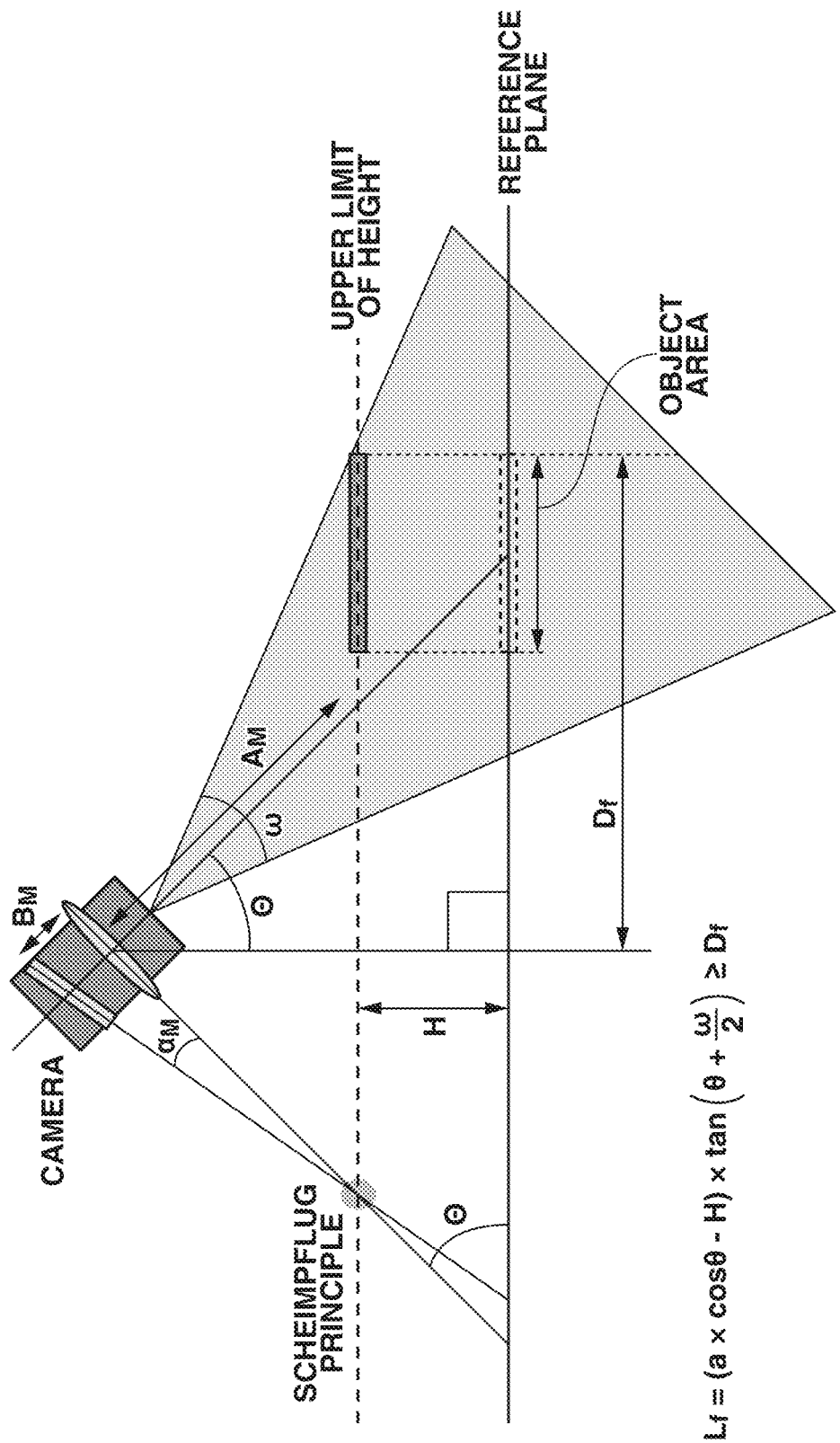
FIG. 10 is a diagram illustrating a part of a principle according to a fourth exemplary embodiment of the disclosure.
Figure 11:
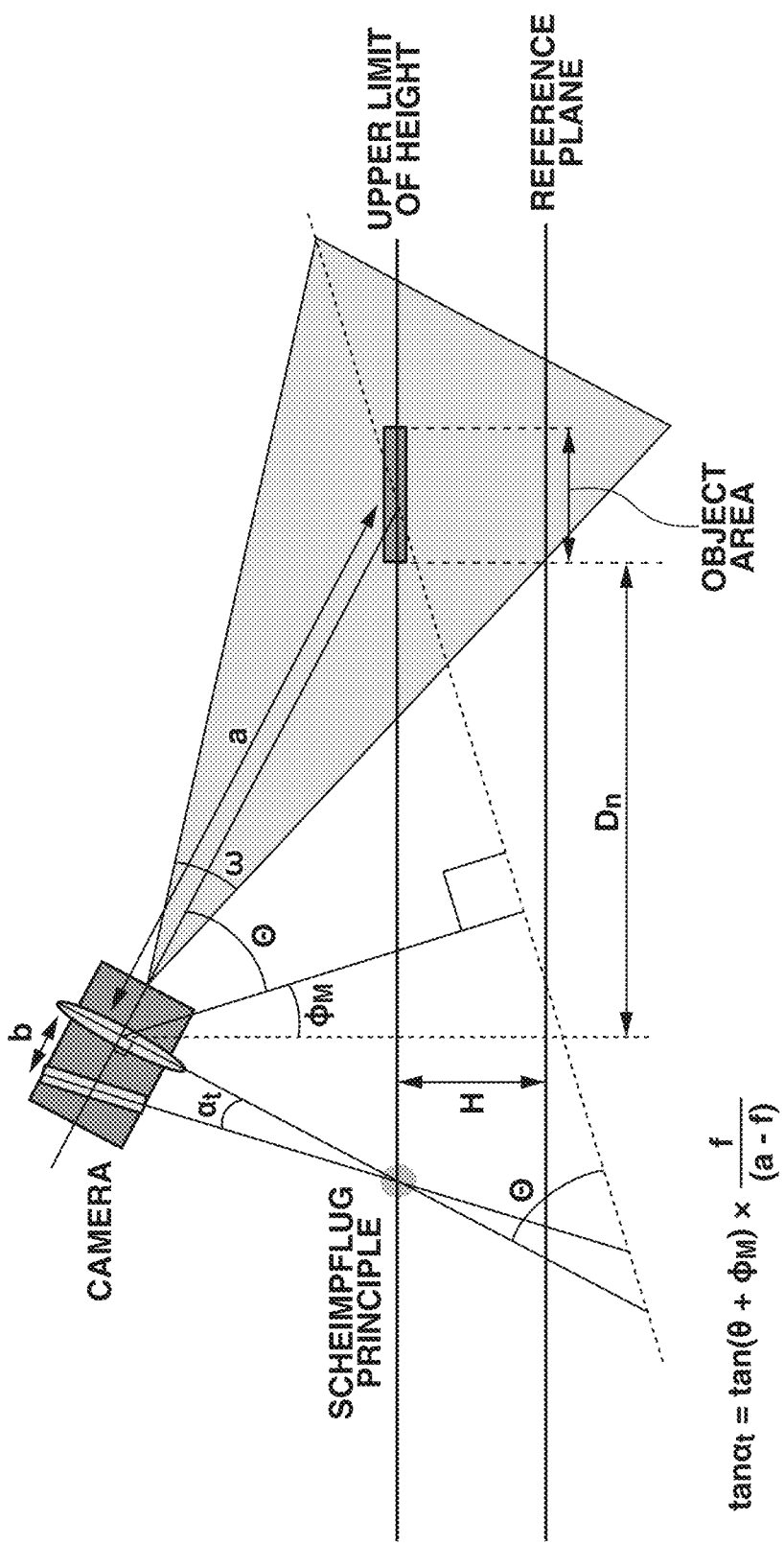
FIG. 11 is a diagram illustrating a part of the principle according to the fourth exemplary embodiment of the disclosure.

Next, with reference to FIGS. 10 and 11, an imaging apparatus according to a fourth exemplary embodiment of the disclosure will be described. In the present exemplary embodiment, a functional configuration is similar to those of the first to third exemplary embodiments.

First, at least a part of the focal plane included in the angle of view is set as the object area. Then, when the focal position change section 104 or the focal position change section 304 changes the position of the focal plane, the position of the focal plane is limited within a predetermined range so that a range of the focal plane corresponding to the object area after the focal plane is changed falls within the angle of view.

When changing the position of the focal plane, the focal position change section 104 limits the amount of movement of the focus lens so that a range of the focal plane corresponding to the object area after the focal plane is changed falls within the angle of view. Specifically, as illustrated in FIG. 10, the focal position change section 104 limits the amount of movement of the focus lens so that the position b of the focus lens is not greater than $B_M$. Consequently, the amount of movement of the focal plane from the reference plane is limited to less than or equal to "upper limit of height" in FIG. 10. $B_M$ in such a case can be calculated under the condition that the distance $L_f$ when the amount of movement of the focal plane is H is greater than or equal to a distance $D_f$ to the far end of the object area.

$$L_f = (a \times \cos\theta - H) \times \tan\left(\theta + \frac{\omega}{2}\right) \geq D_f \qquad \text{(formula 7)}$$

When changing the position of the focal plane, the focal position change section 304 limits the amount of change in the direction (the tilt angle) of the imaging apparatus 1000 so that a range of the focal plane corresponding to the object area before the focal plane is changed falls within the angle of view. Specifically, as illustrated in FIG. 11, the focal position change section 304 limits the amount of change in the direction of the imaging apparatus 1000 so that the amount of change p in the direction of the imaging apparatus 1000 is not greater than φM. Consequently, the amount of movement of the focal plane from the reference plane is limited to less than or equal to "upper limit of height" in FIG. 11. $\varphi_M$ in such a case can be calculated under the condition that the distance $L_n$ when the amount of movement of the focal plane is H is less than or equal to a distance $D_n$ to the near end of the object area.

$$L_n = (a \times \cos(\theta + \phi_M) + H) \times \tan\left(\theta + \phi_M - \frac{\omega}{2}\right) \leq D_n \qquad \text{(formula 8)}$$

By carrying out the above method, it is possible to change the position of the focal plane in the range where the object area falls within the angle of view. In other words, it is possible to prevent the object area from being out of the angle of view when the position of the focal plane is changed.

Next, with reference to FIG. 12, an imaging apparatus according to a fifth exemplary embodiment of the disclosure will be described.

Figure 12:
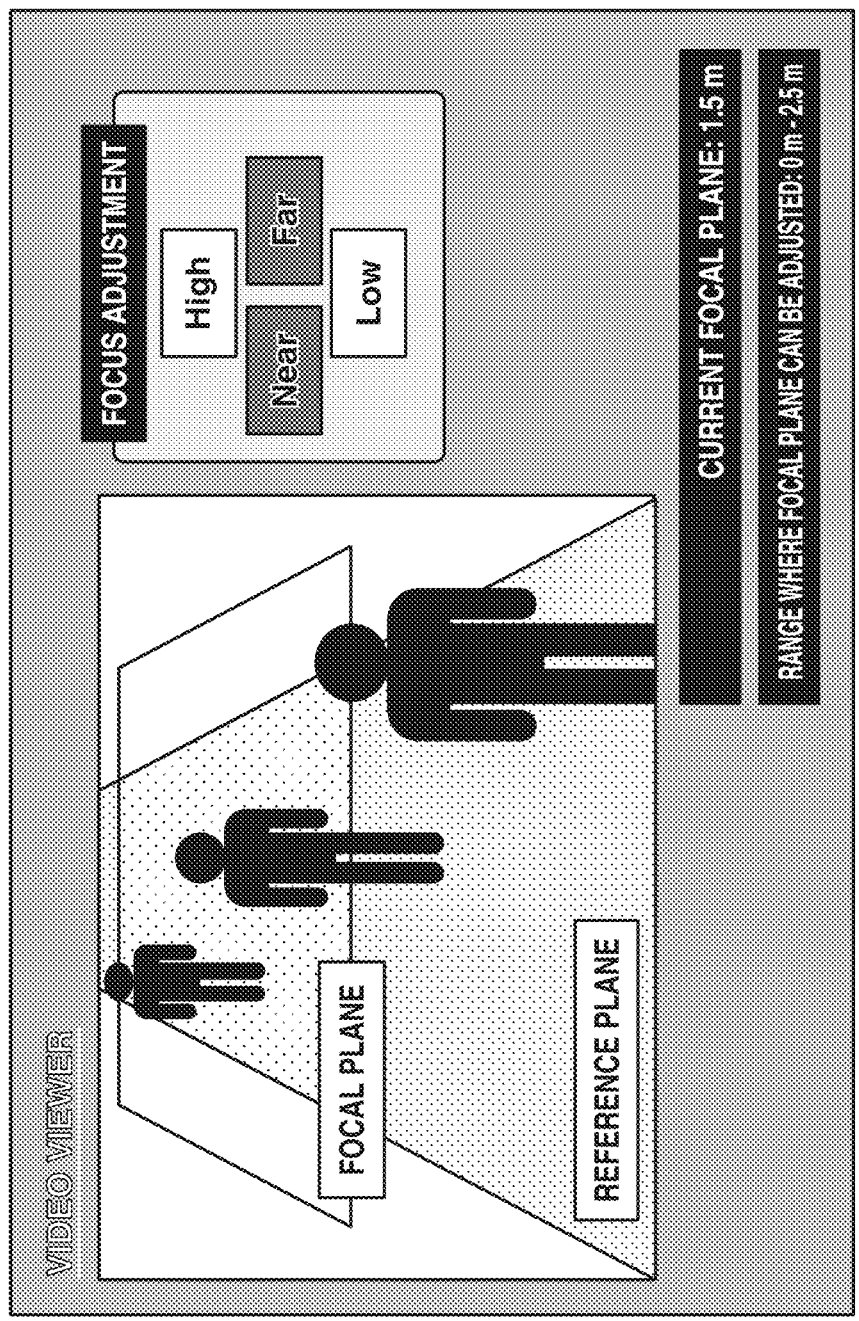
FIG. 12 is a diagram illustrating an example of an operation screen of an imaging apparatus according to a fifth exemplary embodiment of the disclosure.

FIG. 12 is a diagram illustrating an example of an operation screen of the imaging apparatus according to the aspect of the embodiments. As illustrated in FIG. 12, a viewer for a captured image and a focus adjustment function are provided on the operation screen of the imaging apparatus according to the aspect of the embodiments. The focus adjustment function as an instruction unit can adjust the position of the focal plane by pressing buttons on the screen. The buttons of the focus adjustment function include two buttons, i.e., far and near buttons, operated in a case where the focal plane and the optical axis are perpendicular to each other (the sensor is not inclined), and two other, i.e., high and low buttons, buttons operated in a case where the focal plane and the optical axis are not perpendicular to each other (the sensor is inclined). The far and near buttons are used to translate the focal plane in opposite directions to each other. The high and low buttons are also used to translate the focal plane in opposite directions to each other. The method for translating the focal plane when the high and low buttons are operated (in a case where the sensor is inclined) has been as described in the above exemplary embodiments.

In the present exemplary embodiment, control is performed using the above four buttons so that only either pair of the far and near buttons and the high and low buttons is enabled (can be operated). That is, in a case where the focal plane and the optical axis are perpendicular to each other (the sensor is not inclined), the far and near buttons are enabled, and the high and low buttons are disabled (cannot be operated). On the other hand, in a case where the focal plane and the optical axis are not perpendicular to each other (the sensor is inclined), the far and near buttons are disabled, and the high and low buttons are enabled.

The far and near buttons are used to change the position of the focus lens. If only the focus lens is moved in the state where the sensor is inclined, the tilt of the focal plane may change, and the depth of field may change. Thus, in the present exemplary embodiment, in a case where the focal plane and the optical axis are not perpendicular to each other (the sensor is inclined), the far and near buttons are disabled, and the high and low buttons are enabled.

Consequently, it is possible to prevent the tilt of the focal plane from being unintentionally changed when the sensor is inclined, and also always translate the position of the focal plane according to the state of sensor inclination.

Next, with reference to FIGS. 13 and 14, a use case of an imaging apparatus according to a sixth exemplary embodiment of the disclosure will be described.

Figure 13:
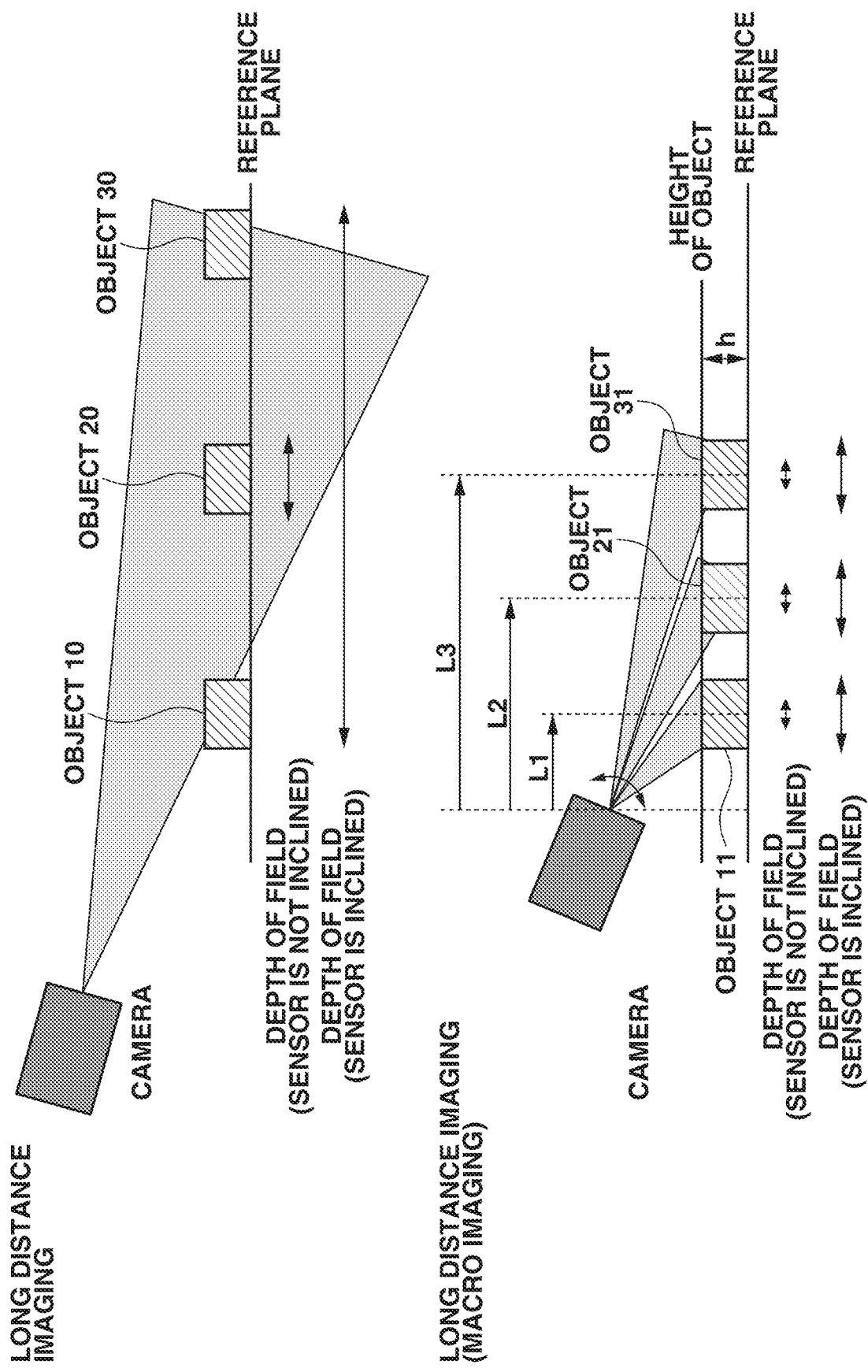
FIG. 13 is a diagram illustrating a part of a principle according to a sixth exemplary embodiment of the disclosure.

The upper part of FIG. 13 illustrates a use case of the first to fifth exemplary embodiments. As has already been described, even in a case where a close object and a distant object exist in the imaging range, a captured image is obtained in which both the close object and the distant object are in focus with the configuration that the sensor is inclined. As an example, a case is illustrated where only an object 20 comes into focus in a case where the sensor is not inclined, but an object 10, the object 20, and an object 30 come into focus in a case where the sensor is inclined. Such a case corresponds to a case where objects are captured from a relatively distant position.

Meanwhile, the lower part of FIG. 13 illustrates a use case of the sixth exemplary embodiment. This case corresponds to a case where an object is captured from a close distance. For example, a case is assumed where the appearance inspection of products manufactured in a factory is performed by capturing images of the products using a camera. As an example, a case is illustrated where, in a case where an image is captured from a close distance, images of objects 11, 21, and 31 are individually captured while changing the direction of the imaging apparatus. In a case where an image is captured from a close distance, only a narrow range can be captured, and only a single object can be captured at a time. Thus, the direction of the imaging apparatus is changed. In a case where an image is captured from a close distance, the depth of field becomes small. Thus, in a case where the sensor is not inclined and only an image of a single object is captured, a portion in focus and a portion out of focus occur in the object. In a case where the sensor is inclined, on the other hand, the entirety of an object that is being captured comes into focus.

Figure 14:
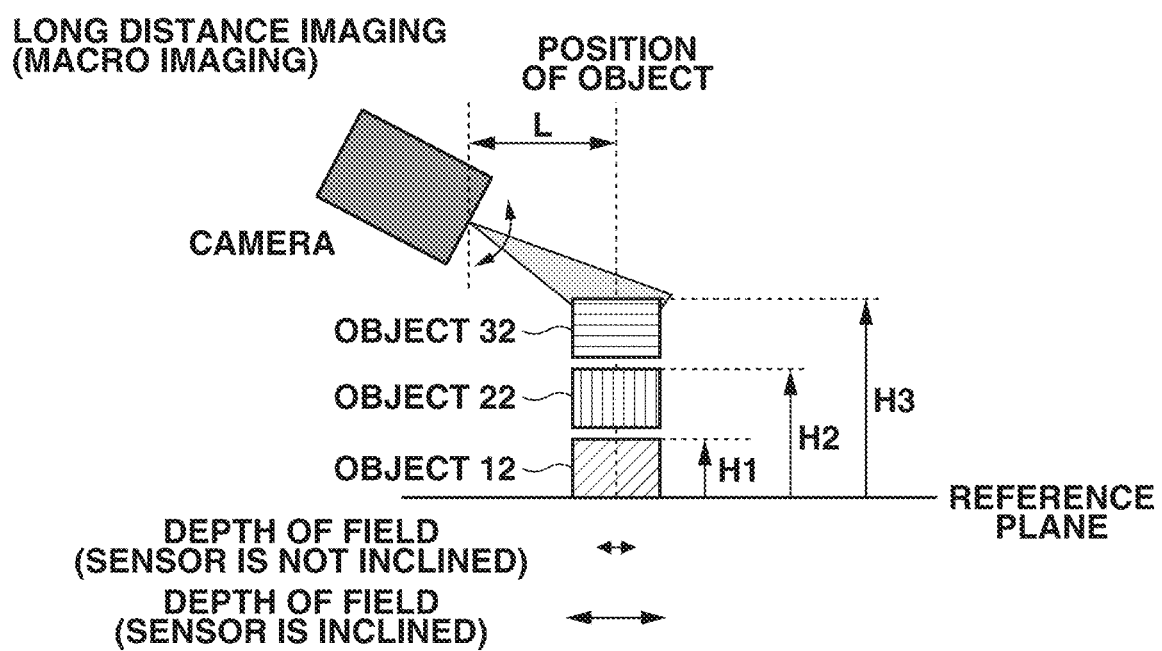
FIG. 14 is a diagram illustrating a part of the principle according to the sixth exemplary embodiment of the disclosure.

FIG. 14 illustrates another use case of the sixth exemplary embodiment. This case also corresponds to a case where an object is captured from a close distance. For example, a case is assumed where products or packages are stacked and an image of an article on the top is captured. The position in the horizontal direction of an object is constant. Thus, the height of the object (the height of the focal plane) to be captured can be changed according to the change in the direction of the imaging apparatus. Similarly to the example illustrated in the lower part of FIG. 13, since an image is captured from a close distance, the depth of field is small in a case where the sensor is not inclined. A portion in focus and a portion out of focus thus can occur in the object.

Figure 15:
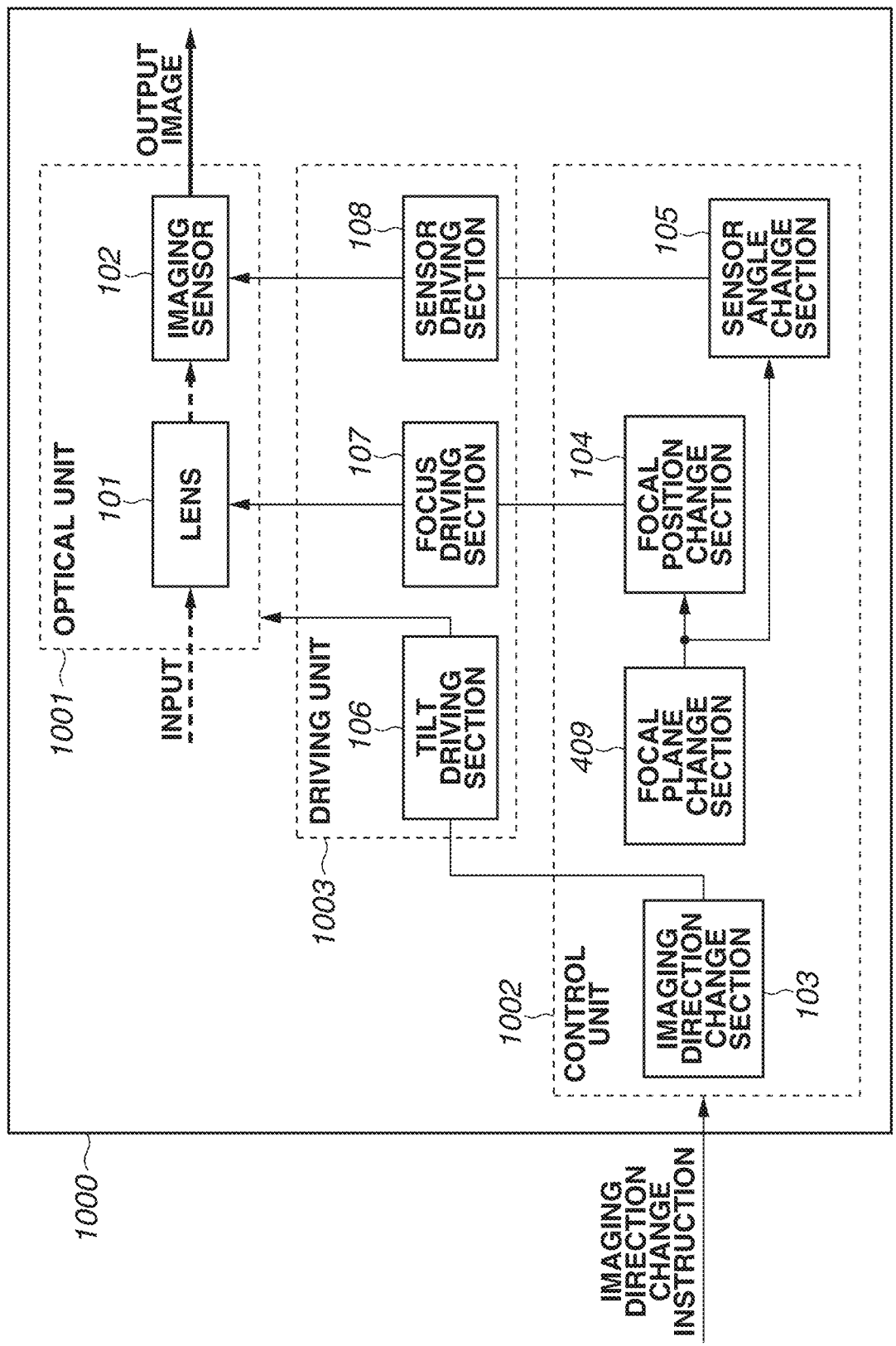
FIG. 15 is a configuration diagram illustrating an imaging apparatus according to the sixth exemplary embodiment of the disclosure.

With reference to FIG. 15, the imaging apparatus according to the sixth exemplary embodiment of the disclosure will be described. In the first exemplary embodiment, the imaging direction change section 103 acquires an instruction to change the position of the focal plane (a focal plane change instruction), and calculates the amount of change in the tilt angle based on the amount of change in the position of the focal plane. In the sixth exemplary embodiment, a focal plane change section 409 acquires an instruction to change the tilt angle (an imaging direction change instruction), and calculates the amount of change in the position of the focal plane based on the amount of change in the tilt angle. Function units similar to those of the first exemplary embodiment are designated by the same numerals, and are not described here. FIG. 15 is a configuration diagram illustrating an example of the functional configuration of the imaging apparatus according to the present exemplary embodiment.

The control unit 1002, as a control unit, according to the present exemplary embodiment includes the imaging direction change section 103, the focal position change section 104, the sensor angle change section 105, and a focal plane change section 409.

The imaging direction change section 103 acquires an instruction to change the tilt angle (an imaging direction change instruction) and instructs the tilt driving section 106 to change the direction of the imaging apparatus 1000 by the amount of change in the tilt angle. The imaging direction change instruction is an instruction specifying the amount of change in the tilt angle of the imaging apparatus 1000 and is an instruction specifying an amount indicating the angle between the reference plane and the optical axis direction of the imaging apparatus 1000.

The focal position change section 104 calculates the position of the focus lens and instructs the focus driving section 107 to drive the focus lens to the calculated position based on the amount of change in the position of the focal plane acquired from the focal plane change section 409.

Based on the amount of change in the position of the focal plane acquired from the focal plane change section 409, the sensor angle change section 105 calculates the inclination angle of the imaging sensor 102. The sensor angle change section 105 instructs the sensor driving section 108 to drive the imaging sensor 102 to reach the calculated inclination angle.

The focal plane change section 409 acquires an instruction to change the tilt angle (an imaging direction change instruction), and calculates the amount of change in the position of the focal plane based on the amount of change in the tilt angle. The focal plane change section 409 outputs the calculated amount of change in the position of the focal plane to the focal position change section 104 and the sensor angle change section 105.

Figure 16:
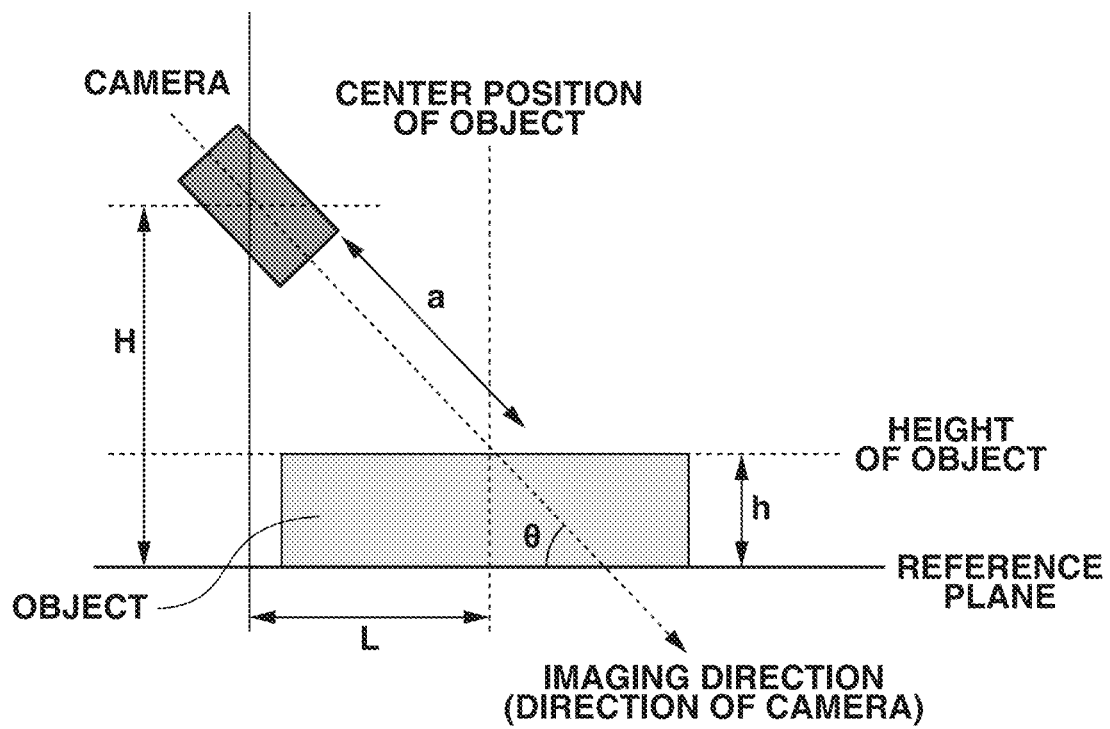
FIG. 16 is a diagram illustrating a part of the principle according to the sixth exemplary embodiment of the disclosure.

Based on the above configuration, as illustrated in FIG. 16, if a height H of a camera is known, and a position L of an object or a height h of the object has a known fixed value, the position of the focal plane can be changed according to the amount of change in a tilt angle θ of the imaging apparatus. That is, an object distance a can be calculated from the position L and the tilt angle θ or the height h and the tilt angle θ. Thus, it is possible to calculate the position of a focus lens and the inclination angle of a sensor. That is, in a case where the position of an object has a known fixed value, the height of the focal plane can be changed to the height of the object according to the amount of change in the tilt angle of the imaging apparatus. In a case where the height of an object has a known fixed value, the position of the focal plane can be changed to the position of the object according to the amount of change in the tilt angle of the imaging apparatus.

While the exemplary embodiments of the disclosure have been described above, the disclosure is not limited to these exemplary embodiments and can be modified and changed in various manners within the scope of the disclosure.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-117177, filed Jun. 25, 2019, and No. 2020-068600, filed Apr. 6, 2020, which are hereby incorporated by reference herein in their entirety.

What is claimed is:

1. A method for controlling an apparatus including at least one processor and a memory that stores a program which, when executed by the at least one processor, causes the at least one processor to function as: a sensor driving unit configured to incline an imaging sensor with respect to a plane orthogonal to an optical axis of an imaging optical system, a focus lens driving unit configured to change a position of a focus lens in the imaging optical system, and a range change unit configured to change an imaging range, the method comprising:

based on an amount of change in position from a reference plane to a target plane corresponding to a target height, controlling the position of the focus lens, the imaging range, and an inclination angle of the imaging sensor so that the reference and target planes are parallel to each other and the target plane is included in an angle of view of the apparatus.

2. The method according to claim 1, wherein based on the amount of change in position from the reference plane to the target plane, the controlling calculates an amount of change in the imaging range.

3. The method according to claim 1, wherein based on the amount of change in position from the reference plane to the target plane and the imaging range, the controlling calculates the position of the focus lens.

4. The method according to claim 1, wherein based on the amount of change in position from the reference plane to the target plane, the amount of change in the imaging range, and the position of the focus lens, the controlling calculates the inclination angle of the imaging sensor.

5. The method according to claim 1, wherein the range change unit changes a direction of the apparatus.

* * * * *